United States Patent
Lenac et al.

[11] Patent Number: 5,860,780
[45] Date of Patent: Jan. 19, 1999

[54] SELF-LUBRICATED THRUST RIVET

[75] Inventors: Albert Lenac, Montclair; Antoni Jan Szwedziuk, Cedar Grove; Louis V. Portelli, Clifton, all of N.J.

[73] Assignee: Norton Performance Plastics Corporation, Wayne, N.J.

[21] Appl. No.: 763,637

[22] Filed: Dec. 4, 1996

[51] Int. Cl.⁶ .................... F16B 19/06; F16B 19/08
[52] U.S. Cl. .................. 411/501; 411/506; 411/903; 16/273
[58] Field of Search ................ 411/43, 69, 70, 411/501–507, 902, 903, 908; 16/273

[56] References Cited

U.S. PATENT DOCUMENTS

| | | | |
|---|---|---|---|
| 2,510,693 | 6/1950 | Green | 411/908 X |
| 2,685,813 | 8/1954 | Lampman et al. | 411/506 X |
| 3,009,507 | 11/1961 | Martin et al. | 218/29 |
| 3,086,072 | 4/1963 | Forman | 411/903 X |
| 3,140,540 | 7/1964 | Greenman | 29/512 |
| 3,183,394 | 5/1965 | Hipszer et al. | 313/270 |
| 3,531,903 | 10/1970 | Swanson | 52/729 |
| 3,640,361 | 2/1972 | Spichala | 192/70.18 |
| 3,895,409 | 7/1975 | Kwatonowski | 16/2 |
| 3,939,529 | 2/1976 | Davis | 16/179 |
| 4,030,003 | 6/1977 | Wright et al. | 361/293 |
| 4,156,049 | 5/1979 | Hodes et al. | 428/409 |
| 4,202,243 | 5/1980 | Leonhardt . | |
| 4,258,089 | 3/1981 | Anderson et al. | 427/318 |
| 4,388,744 | 6/1983 | Pantke et al. . | |
| 4,405,256 | 9/1983 | King, Jr. | 411/69 X |
| 4,409,354 | 10/1983 | Namba et al. | 524/431 |
| 4,478,544 | 10/1984 | Strand | 411/908 X |
| 4,688,317 | 8/1987 | Matuschek | 29/509 |
| 4,721,406 | 1/1988 | Davis | 403/163 |
| 4,812,367 | 3/1989 | Bickle | 428/332 |
| 4,897,439 | 1/1990 | Rau et al. | 524/404 |
| 4,914,146 | 4/1990 | Honda et al. | 524/449 |
| 5,009,557 | 4/1991 | Dessirier | 411/504 |
| 5,009,959 | 4/1991 | Matsushita et al. | 428/419 |
| 5,015,136 | 5/1991 | Vetter et al. . | |
| 5,024,881 | 6/1991 | Matucha et al. | 428/323 |
| 5,033,900 | 7/1991 | Pine . | |
| 5,573,846 | 11/1996 | Harig et al. | 428/323 |
| 5,729,882 | 3/1998 | Travis | 411/502 X |

FOREIGN PATENT DOCUMENTS 44 17 279 A1  11/1995  Germany .

*Primary Examiner*—Neill Wilson
*Attorney, Agent, or Firm*—Mary E. Porter; Richard L. Sampson

[57] ABSTRACT

A hollow self-lubricating thrust rivet or fastener is adapted to pivotably fasten first and second members to one another. The fastener is laminated on its outer surface with a self-lubricating or lubricious bearing material such as an organic polymer or plastic material. The bearing material provides the fastener with requisite lubricity to enable the members to rotate about the fastener without requiring application of a discrete lubricant to the interface of the fastener and the members. The fastener thus effectively combines the functions of a conventional fastener and a conventional bearing into a single unitary device. The fastener preferably includes an annular thrust portion laminated with the lubricious bearing material and adapted for placement between the members. The thrust portion effectively eliminates the need for installation of a discrete washer between the members.

32 Claims, 2 Drawing Sheets

SELF-LUBRICATED THRUST RIVET

BACKGROUND OF THE INVENTION

1. Field of the Invention

This invention relates to fasteners, and more particularly to a maintenance free fastener and bearing combination adapted to pivotably couple a plurality of members to one another.

2. Background Information

Many applications call for convenient means for rotatably or pivotably fastening multiple members to one another in a maintenance free manner. Examples of such applications include multiple bar linkages commonly utilized in the automotive industry for trunk deck lid and hood hinges, and as window stays adapted to raise and lower windows. Additional applications may include collapsible baby carriages or strollers, beach chairs, recliners, toys, automobile seats, or substantially any other application involving pivotable movement. For example, it is common to couple two arms of a window stay or a hood hinge linkage using a rivet, pin or similar fastener that extends through two apertures formed one in each of the adjacent ends of the arms to be joined. A bushing formed of a self-lubricating material such as nylon or suitable plastic material is interposed between the rivet and the arms to prevent metal to metal contact in the joint between moving parts of the arms and rivet. In some instances, a washer may be installed concentrically about the bushing between the two arms to facilitate the rotational movement of the arms relative to one another and help prevent binding.

Moreover, in a variation of the above approach, it is often desirable to utilize a two-part bushing to facilitate manufacturability and to provide enhanced pivotal movement. In this regard, the bushing is essentially provided in two discrete half portions. A first half portion is permanently installed and captured, such as by swaging or flanging operations, in the aperture of the first arm, while a second half portion is similarly installed in the aperture of the second arm. A fastener such as a rivet is then installed in a conventional manner into both halves of the bushing to join the arms to one another.

While the foregoing approach may operate satisfactorily, it is not without drawbacks. In particular, the configuration utilizes a relatively high number of discrete components, each of which must be separately inventoried and installed. This tends to add undesirable complexity and expense to the overall assembly.

Furthermore, it is important that such joints be accurately formed so that the joint is relatively tight and the fastener or rivet, which holds the joint together, is properly oriented. If the rivet is off-center within the apertures and/or canted to an oblique angle relative to the axes of the apertures during manufacture or operation, due to, for example, insufficiently loose tolerances, the joint will be inaccurately formed and the arms will not be maintained in parallel orientation to one another. Any misalignment at the joint is magnified at the distal ends of the arms and thus it is important that such joints are so constructed as to minimize such difficulties. In addition, joints that are excessively loose when installed in, for example, automobiles, may tend to undesirably rattle during vehicle operation. For these reasons, and to help prevent the joints from loosening prematurely upon repeated use, it is desirable to manufacture the joint components to relatively tight tolerances.

In this regard, generally speaking, tolerance stacking and other factors afford assemblies fabricated with a relatively large number of discrete components with greater opportunities for misalignment and mechanical loosening than similar assemblies fabricated from fewer discrete components. It thus may be desirable to hold components of the former assemblies to tighter tolerances than those of the latter. Those skilled in the art will recognize that tighter tolerances tend to relatively increase the expense of component manufacture.

A need thus exists for an improved maintenance free fastener and bearing combination that utilizes fewer components and otherwise overcomes the problems of the prior art.

SUMMARY OF THE INVENTION

According to a first aspect of the present invention, a fastener adapted to join a plurality of members to one another, includes a shank portion elongated along a central axis thereof, and is adapted for receipt within bores or apertures in the plurality of members. The shank portion has a first end and a second end, each of which are adapted for being flanged to capture the plurality of members therebetween. A sliding layer is laminated to an outer surface of the shank portion, in which the sliding layer is adapted to engage at least one member of the plurality of members to provide for substantially maintenance free sliding movement of the member relative to the fastener.

In a second aspect of the present invention, a fastener adapted to join a plurality of members to one another, includes a shank portion elongated along a central axis thereof, and is adapted for receipt within apertures in the plurality of members. The shank portion has a first end, a second end and a thrust portion extending transversely outward from a medial perimeter of the shank portion. The first end is adapted for being flanged to capture at least one member of the plurality of members between the thrust portion and the first end. A sliding layer is laminated to an outer surface of the shank portion, in which the sliding layer is adapted to engage the at least one member of the plurality of members to provide for substantially maintenance free sliding movement of the at least one member relative to the fastener.

In a third aspect of the invention, a method of fabrication of a fastener adapted to join a plurality of members to one another, includes the steps of providing a substrate of relatively high ductility, tensile strength and shear strength and laminating a sliding layer to the substrate. The substrate is formed into a shank portion elongated along a central axis thereof, so that the sliding layer is disposed on an outer surface of the shank portion so that the shank portion is adapted for receipt within bores or apertures of the plurality of members. The shank portion is provided with a first end and a second end that are each adapted to be flanged to capture the plurality of members therebetween, so that the sliding layer is adapted to engage at least one member of the plurality of members to provide for substantially maintenance free sliding movement of the at least one member relative to the fastener.

According to a fourth aspect of the invention, a method of fabrication of a fastener adapted to join a plurality of members to one another, includes the steps of providing a substrate of relatively high ductility, tensile strength and shear strength and laminating a sliding layer to the substrate. The substrate is formed into a shank portion elongated along a central axis thereof, so that the sliding layer is disposed on an outer surface of the shank portion, and so the shank portion is adapted for receipt within bores or apertures of the plurality of members. A thrust portion is formed to extend transversely outward from a medial perimeter of the shank portion. A first end of the shank portion is provided with the ability to be flanged to capture at least one member of the plurality of members between the thrust portion and the first end, so that the sliding layer is adapted to engage the at least one member of the plurality of members to provide for substantially maintenance free sliding movement of the at least one member relative to the fastener.

In a fifth aspect of the present invention, a method of rotatably fastening a plurality of members to one another, includes the steps of providing a fastener having a shank portion elongated along a central axis thereof, with a first end, a second end and a thrust portion extending transversely outward from a medial perimeter of the shank portion. The first end and the second end are each provided with the ability to be flanged, and a sliding layer is laminated to an outer surface of the shank portion. The first end of the shank portion is inserted into a receiving aperture in at least one member of the plurality of members and is flanged to capture the at least one member of the plurality of members between the thrust portion and the first end. The second end of the shank portion is inserted into a receiving aperture in at least one other member of the plurality of members and flanged to capture the at least one other member of the plurality of members between the thrust portion and the second end. The sliding layer is adapted to engage the at least one member of the plurality of members to provide for substantially maintenance free sliding movement of the at least one member relative to the fastener.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Figures 1, 2:
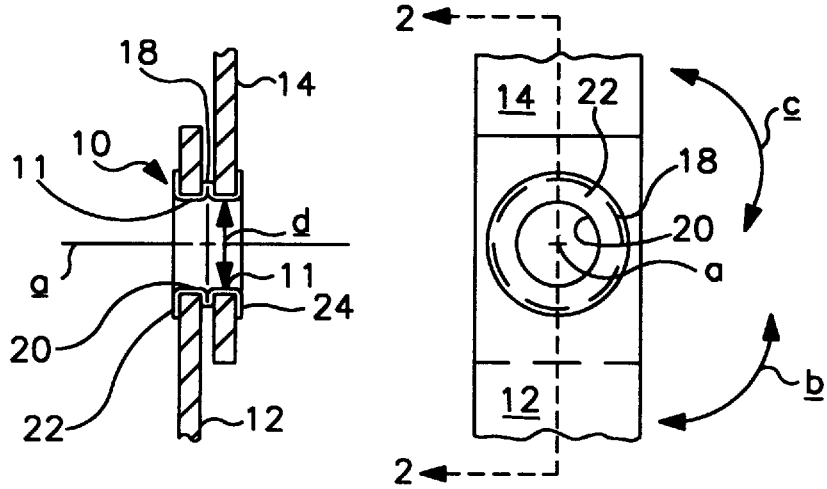
FIG. 1 is a plan view, with portions in phantom, of an embodiment of a fastener of the subject invention, shown fully installed in a portion of a typical application.
FIG. 2 is a cross-sectional elevational view taken along 2—2 of FIG. 1.
Figure 3:
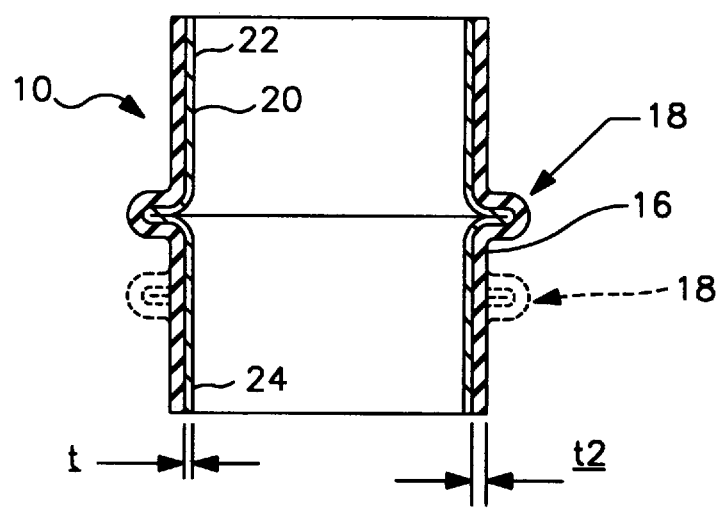
FIG. 3 is a view similar to that of FIG. 2, on an enlarged scale, of the fastener prior to installation, with optional portions thereof shown in phantom.

Briefly described, as shown in the drawings, an embodiment of the present invention includes a hollow self-lubricating thrust rivet or fastener 10 adapted to join first and second members 12 and 14 (FIGS. 1 and 2) to one another in such a way as to permit the members to pivot relative to one another about central axis a (FIGS. 1 and 2) as indicated by arrows b and c. As best shown in FIG. 3, a self-lubricating or lubricious bearing material 16 such as an organic polymer or plastic material, is laminated onto an outer surface of fastener 10. Bearing material 16 provides fastener 10 with requisite lubricity to enable members 12 and 14 to rotate substantially freely about the fastener without requiring application of a discrete lubricant to the interface of the fastener and the members. In this manner, fastener 10 effectively combines the functions of a conventional fastener and a conventional bearing into a single unitary device.

Figure 4:
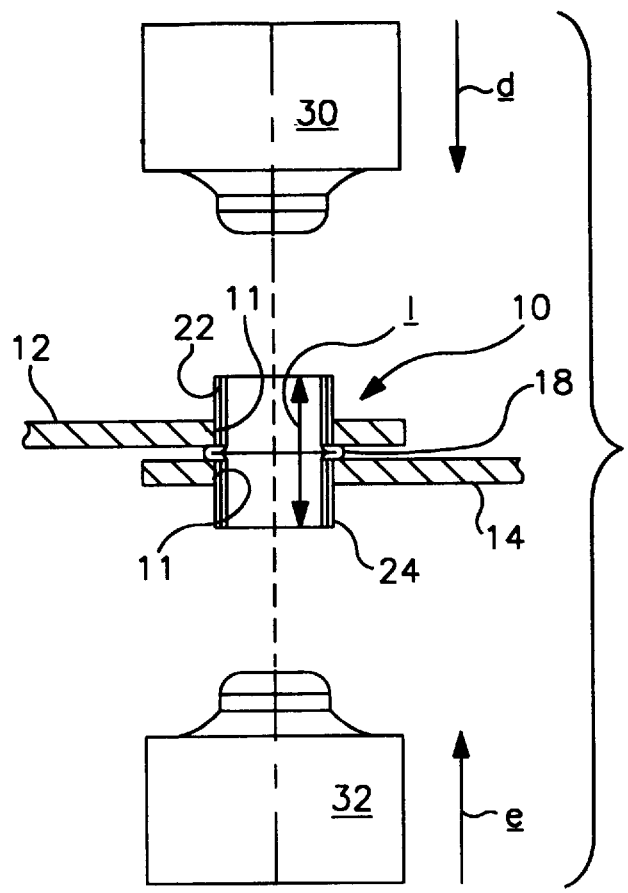
FIG. 4 is a view similar to that of FIG. 2, during a step in the installation of the fastener.

Moreover, in a preferred embodiment, fastener 10 is provided with an annular thrust portion 18 (FIG. 3). Thrust portion 18 is adapted for placement between members 12 and 14 as shown in FIGS. 2 and 4. The thrust portion eliminates the need for installation of a discrete washer between members 12 and 14.

For definitional purposes, throughout this disclosure, the terms "self-lubricated" or "self-lubricating" shall refer to use of a material that exhibits sufficient lubricity to nominally eliminate the need for application of a discrete lubricant to a bearing surface. The term "axial" when used in connection with an element described herein, shall refer to a direction which is substantially parallel to axis a of fastener 10 and apertures 11 as shown in FIGS. 1 and 2. Similarly, the terms "transverse" and "radial" shall refer to a direction substantially orthogonal to the axial direction.

Referring now to the drawings in detail, as shown in FIGS. 1 and 2, fastener 10 of the present invention preferably includes a hollow shank portion 20 of substantially cylindrical configuration. Shank portion 20 is provided with a predetermined diameter d sufficient to enable fastener 10 to be received in a concentric, substantially interference fit within cylindrical apertures or bores 11 disposed in members 12 and 14 as shown. Thrust portion 18 extends radially outward from a medial circumference of the shank portion to form an annular, generally discoid projection adapted for disposition between members 12 and 14 as shown. Thrust portion 18 extends a predetermined distance in the radial direction, as best shown in FIG. 1, sufficient to enable the thrust portion to function as a conventional washer between members 12 and 14, as will be discussed in greater detail hereinafter.

Shank portion 20 is also provided with an axial dimension or length l (FIG. 4). This length is predetermined to enable first and second ends 22 and 24 of the shank portion, respectively, to extend sufficiently beyond members 12 and 14 to enable the ends to be flanged radially outward to capture members 12 and 14 therebetween as shown in FIGS. 1 and 2. In a preferred embodiment, as shown in FIG. 2, first member 12 is captured between first end 22 and thrust portion 18, while second member 14 is captured between second end 24 and thrust portion 18.

Shank portion 20 is preferably fabricated as a relatively thin-walled tube from a relatively ductile, high tensile strength, material capable of relatively high elongation without fracture. The shank portion is provided with a predetermined thickness t (FIG. 3). Acceptable materials include aluminum, stainless steel and conventional drawing quality sheet steel. A preferred embodiment utilizes a drawing quality steel such as that commonly referred to as SAE 1010. This construction serves to facilitate the above described flanging operations, as well as fabrication of one or more thrust portions 18 (as will be discussed hereinafter), while it also provides fastener 10 with sufficient strength to effectively retain members 12 and 14 in a wide range of applications.

Referring now to FIG. 3, bearing material 16 is laminated or applied to the outer surface of fastener 10, including first and second ends 22 and 24 and thrust portion 18. As shown in phantom, one or more additional thrust portions, which are similarly laminated with bearing material 16, may be provided, as will be discussed hereinafter. Bearing material 16 is fabricated from a lubricious substance, such as a polymer or plastic material. Preferred plastic materials generally include temperature tolerant polymer systems, containing high melt temperature organic polymers, and/or systems characterized by a relatively low coefficient of friction. The materials have to be suitable for application or lamination to the metal substrate. By selecting an appropriate melt adhesive layer of, for example, fluoropolymer, nominally any organic polymer may be laminated to the metal substrate. Examples of useful polymeric materials include fluoropolymers (e.g., polytetrafluoroethylene (PTFE), fluorinated ethylene-propylene (FEP) and PTFE perfluoroalkoxy polymer (PFA)), acetal, acrylonitrile-butadiene-styrene, styrene-acrylonitrile, polystyrene, polycarbonate, polyimides, polyetherimide, polyether ether ketone, polyethylene, polypropylene, polysulfones (e.g., polyethersulfone), Nylon (polyamide), polyphenylene sulfide, polyurethane, polyester, polyphenylene oxide, and blends and alloys thereof. Lubricated or filled thermoplastics are useful. These include various polymers containing additives that affect characteristics such as lubricity, mechanical strength, wear resistance and thermal and electrical conductivity, including, but not limited to, a minor weight percentage (e.g., 0.5 to 49.5 percent) of fluoropolymer, glass and/or carbon fiber, silicone, graphite, molybdenum disulfide, porous bronze, and other materials known in the art.

The choice of a particular material for a given application may be made based on the coefficient of friction ($\mu$) of the material. The coefficient of friction between two surfaces is defined in the CRC Handbook of Chemistry and Physics (62nd Edition, 1981–1982) as the ratio of the force required to move one surface over the other to the total force pressing the two together. Thus, if F is the force required to move one surface over another and W, the force pressing the surfaces together, the coefficient of friction $\mu$ is provided by the formula $\mu=F/W$.

For relatively ordinary or light duty applications, acceptable materials include those that have a static coefficient of friction $\mu$ at least below that reported in the CRC Handbook of Chemistry and Physics for steel on steel (0.58) and preferably similar to that of polyethylene (0.2). In heavier duty applications, such as for automotive or general industrial use, materials having relatively lower coefficients are preferred. Preferred materials for these applications are those that, for example, have a coefficient of static friction ($\mu$) similar to that of PTFE (0.04).

In an example of a preferred embodiment fastener 10 comprises a multi-layered laminate of the type disclosed in U.S. Pat. No. 5,573,846 entitled POLYFLUOROCARBON COATED METAL BEARING which issued on Nov. 12, 1996 (hereinafter, the "'846 patent") and which is hereby incorporated by reference in its entirety. Briefly described, bearing material 16 thus preferably includes an intermediate layer of a fluoropolymer, e.g., ethylene—tetrafluoroethylene, applied directly to metallic shank portion 20 by pressure and/or heat. A second sliding layer of polytetrafluoroethylene, polyimide or polyether ether ketone, or combinations thereof, is applied to the intermediate layer. The sliding layer is thus adapted for direct engagement with members 12 and 14. Bearing material 16 is provided with a predetermined thickness t2 which may depend upon the particular composition utilized. So fabricated, the bearing material advantageously provides fastener 10 with requisite lubricity while tending to resist delamination from metal shank portion 20.

Figure 5:
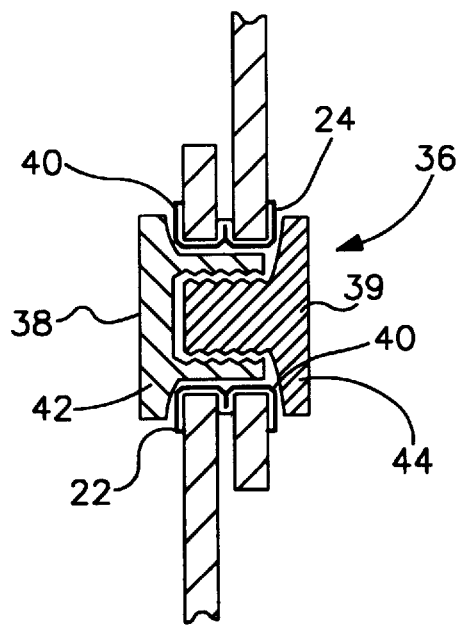
FIG. 5 is a schematic view similar to that of FIG. 2, on an enlarged scale, of an alternate embodiment of the fastener of the subject invention.

Referring now to FIG. 5, in an alternative embodiment, a generally cylindrical pin 36 may be disposed, preferably in an interference fit, concentrically within fastener 10. The pin is preferably utilized in relatively high load applications to structurally reinforce the fastener, particularly with respect to transverse or shear loading. In addition, as shown, pin 36 may be provided with heads 38 and 39 at opposite ends thereof for engagement with first and second ends 22 and 24, respectively. Thus, pin 36, including heads 38 and 39, enables fastener 10 to withstand increased shear, tensile and compressive loading. Examples of relatively high load applications in which use of pin 36 may be desirable include automobile seats and door hinges.

Pin 36 may be fabricated from any suitable material capable of providing the desired structural characteristics, such as, for example, steel, stainless steel or aluminum. The pin may be constructed as a single unitary member, or may alternatively include a pair of mutually engageable fastener portions. For example, pin 36 may include an internally threaded portion 42 engageable with an externally threaded portion 44, as shown. As also shown, each head 38 and 39 may be provided with a generally concave surface 40 to facilitate flanging ends 22 and 24 as will be discussed hereinafter.

Although fastener 10 is shown and described herein having one or more radially extending thrust portions 18, it should be recognized by those skilled in the art that any or all of the thrust portions 18 may be eliminated and/or replaced with a conventional washer disposed concentrically with the fastener, without departing from the spirit and scope of the present invention.

It should also be recognized by those skilled in the art that fastener 10 may be provided with an axial dimension or length l sufficient to permit a member to slide along the length of the fastener in addition, or as an alternative, to rotational movement as discussed herein, without departing from the spirit and scope of the present invention. In this regard, although the fastener of the present invention has been shown and described herein as having a substantially circular transverse cross-section, those skilled in the art should recognize that fastener 10 may be provided with substantially any transverse cross-sectional geometry, including, but not limited to, a rectangular or square shaped geometry, without departing from the spirit and scope of the invention.

A preferred embodiment of the invention having been fully described, the following is a description of the fabrication, installation and operation thereof.

Initial steps in fabricating a preferred embodiment of fastener 10 include applying bearing material 16 to a substantially flat metallic substrate, such as steel sheets of the type and thickness t as described hereinabove. The bearing material is preferably applied in the manner disclosed in the above-referenced '846 patent to yield a nominally uniform layer of predetermined thickness t2 superposed thereover. The flat sheets are subsequently cut into strips, each of which are then formed into hollow cylinders in a conventional manner, with bearing material 16 disposed on the outer cylindrical surface thereof. At this point, fabrication of fastener 10 is substantially complete, but for the fabrication of thrust portion(s) 18. In this regard, the strips are cut to predetermined dimensions so that the hollow cylinders produced thereby have the predetermined diameter d of fastener 10 as discussed hereinabove. Similarly, the hollow cylinders are provided with a predetermined axial dimension equal to length l (FIG. 4) of fastener 10 plus an additional predetermined length sufficient to accommodate subsequent formation of one or more thrust portions 18.

The next step in fabrication of preferred fastener 10 is to form a thrust portion 18. This may be accomplished by utilizing a jig or fixture (not shown) that includes a cylindrical bar slidably and concentrically disposed within the fastener to supportably engage the inner cylindrical surface thereof. End holders (not shown) are provided to engage first end 22 and second end 24 about their outer diameters. In this manner, all but the outer surface of a medial portion of fastener 10 is effectively supported and thus constrained against movement in the radial direction. An axial compressive force is then applied to the cylinder at first and second ends 22 and 24. This compressive force is of a sufficient predetermined magnitude to generate buckling of the hollow cylinder at the unconstrained medial circumference thereof, in the radially outward direction. This buckling serves to form the generally annular, discoid thrust portion 18, as discussed hereinabove, to thus complete fabrication of fastener 10 as best shown in FIG. 3.

As shown in phantom in FIG. 3 and discussed hereinabove, additional thrust portions may be provided by fastening an annular collar or similar constraining device (not shown) circumferentially about a medial portion of the fastener prior to application of the axial compressive force. The axial compressive force will generate buckling to create thrust portions 18 at the unconstrained portions of the fastener axially between the end holders and collar. One skilled in the art will recognize that the distance between adjacent thrust portions will be determined by the axial dimension of the collar. Moreover, multiple collars may be disposed at spaced locations along the medial portion of the fastener to generate multiple thrust portions. The collars may be conveniently fabricated from semi-circular half portions to facilitate removal from fastener 10 once formation of the thrust portions is complete.

Multiple thrust portions may serve as spacers to maintain members 12 and 14 a predetermined axial distance from one another along fastener 10. Alternatively, a member may be connected to fastener 10 between the thrust portions to facilitate pivotably connecting more than two members. In this regard, it is contemplated that one or more of the thrust portions may be fabricated after insertion of the tube into a bore of a member to be joined thereby. Such a member will thus function as the annular collar to constrain the fastener during formation of one or more thrust portions 18, which when fully formed, will serve to capture the member on the fastener.

As also discussed hereinabove, the axial compression step may be omitted in the event a conventional washer is to be utilized in lieu of thrust portion 18. In this regard, the predetermined dimensions of the strips utilized to form each cylinder are preferably reduced to eliminate the additional length otherwise necessary for formation of thrust portion 18. The cylinder is thus preferably provided with a predetermined axial dimension equal to length 1 (FIG. 4) of fastener 10.

Although a preferred method of fabrication has been described, steps thereof may be modified, eliminated or performed in varying sequence. For example, fastener 10 may be alternatively fabricated by forming the metallic substrate into cylinders prior to application of bearing material 16 thereon. In this regard, the metallic substrate may be fabricated into a tube of the above-described predetermined dimensions, by conventional hot or cold forming operations, such as roll forming, piercing, drawing or extrusion processes to produce either seamed or seamless tubes. Thereafter, bearing material 16 may be applied to the tube in any convenient manner, such as, for example, by spray coating. Application of the bearing material may be performed either before or after formation of one or more thrust portions 18 as described hereinabove.

In fabricating fasteners for non-demanding applications where resistance to delamination is not required, the intermediate, adherent layer of fluoropolymer may be eliminated or replaced with an adhesive material or plastic binder material to apply the bearing material 16 by spray coating, melt application, or other application technique, with or without the application of pressure or heat.

Referring now to FIG. 4, once fully formed with either single or multiple thrust portions, installation may be completed by inserting ends 22 and 24 of fastener 10 into receiving apertures 11 of the remaining members to be joined, such as members 12 and 14 as shown. As mentioned hereinabove, use of lubricious bearing material 16 enables the dimensions of fastener 10 and the receiving apertures to range from a clearance or sliding fit to a relatively heavy interference fit. Advantageously, this range of acceptable fits permits the members of a particular application to be fabricated with relatively loose tolerances, for associated relative reductions in manufacturing costs.

As also shown and discussed hereinabove, thrust portion 18 is preferably interposed between the joined members, as shown with respect to members 12 and 14, to function as a washer and advantageously eliminate the need for use of a discrete washer. The thrust portion thus eliminates handling costs that may otherwise be incurred in connection with maintaining separate washers in inventory and performing discrete installation operations necessary to place them in proper position about fastener 10, between the joined members.

When fastener 10 is so positioned, first and second ends 22 and 24 will extend a predetermined distance beyond members 12 and 14, respectively. First and second anvils 30 and 32 are then moved in directions indicated by arrows d and e into engagement with ends 22 and 24, respectively. This engagement serves to flange the ends and capture the members therebetween as shown in FIGS. 1 and 2, to complete installation of the fastener.

In an alternative embodiment, as discussed hereinabove with respect to FIG. 5, pin 36 may be installed concentrically within fastener 10 to provide the fastener with structural reinforcement. The pin may be installed subsequent to the aforementioned flanging operation. In a further alternative, however, pin 36 may comprise a pair of mutually engageable threaded fastener portions 42 and 44 of the type described hereinabove. Such a pin 36 may be installed prior to the flanging operations by inserting the pin portions through first and second ends 22 and 24 for initial threadable engagement with one another. Continued threadable engagement will draw portions 42 and 44 towards one another whereupon concave surfaces 40 will serve to engage and flange ends 22 and 24 of fastener 10. This construction nominally eliminates the need for use of anvils 30 and 32 and the discrete flanging operation.

The present invention thus combines the functions of both a conventional fastener and a bearing, into a single, unitary device. Advantageously, this aspect eliminates several assembly steps relative to alternative arrangements discussed hereinabove. In particular, steps of inserting and flanging a separate bushing portion onto each member may be eliminated. Moreover, the number of parts in the assembly is reduced to facilitate material handling, to reduce inventory requirements and/or produce a tighter overall assembly with lower relative tolerances. These advantages contribute to effectively lower manufacturing costs relative to alternative arrangements. Further still, in addition to the benefits described hereinabove, thrust portion 18, if utilized, conveniently serves as a catch or locator to maintain fastener 10 in proper orientation relative to members 12 and 14 during the installation discussed hereinabove.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A fastener adapted to join a plurality of members to one another, said fastener comprising:
    a shank portion elongated along a central axis thereof, said shank portion adapted for receipt within apertures disposed in the plurality of members;
    said shank portion having a first end and a second end, said first end and said second end each adapted for being flanged to capture the plurality of members therebetween;
    a sliding layer disposed on an outer surface of said shank portion, wherein said sliding layer is adapted to engage at least one member of the plurality of members to provide for substantially maintenance free sliding movement of the at least one member relative to said fastener.

2. The fastener as set forth in claim 1, wherein said shaft portion is substantially cylindrical and said sliding layer is adapted to engage the at least one member of the plurality of members to provide for substantially maintenance free rotational movement of the at least one member of the plurality of members relative to said fastener.

3. The fastener as set forth in claim 1, wherein said sliding layer comprises a lubricious plastic material.

4. The fastener as set forth in claim 1, wherein said lubricious plastic material is selected from the group consisting of fluoropolymers, acetals, acrylonitrile-butadiene-styrenes, styrene-acrylonitriles, polystyrenes, polycarbonates, polyimides, polyetherimides, polyether ether ketones, polyethylenes, polypropylenes, polysulfones, polyamides, polyphenylene sulfides, polyurethanes, polyesters, polyphenylene oxides, and blends and alloys thereof and filled compositions thereof.

5. The fastener as set forth in claim 4, wherein said lubricious material has a coefficient of friction no greater than 0.2.

6. The fastener as set forth in claim 1, wherein said shank portion is fabricated of a metallic material and said lubricious material is laminated to said metallic material.

7. A fastener adapted to join a plurality of members to one another, said fastener comprising:
    a shank portion elongated along a central axis thereof, said shank portion adapted for receipt within apertures disposed in the plurality of members;
    said shank portion having a first end, a second end and at least one thrust portion extending transversely outward from a medial perimeter of said shank portion;
    said first end adapted for being flanged to capture at least one member of the plurality of members between said at least one thrust portion and said first end;
    a sliding layer disposed on an outer surface of said shank portion, wherein said sliding layer is adapted to engage the at least one member of the plurality of members to provide for substantially maintenance free sliding movement of the at least one member relative to said fastener.

8. The fastener as set forth in claim 7, wherein said second end is adapted for being flanged to capture at least one other member of the plurality of members between said at least one thrust portion and said second end.

9. The fastener as set forth in claim 7, wherein said shank portion is substantially cylindrical and said at least one thrust portion extends radially outward from a medial circumference thereof.

10. The fastener as set forth in claim 7, wherein said fastener is adapted for being disposed in an interference fit with the aperture of the at least one member of the plurality of members.

11. The fastener as set forth in claim 7, further comprising a plurality of thrust portions.

12. The fastener as set forth in claim 7, wherein said sliding layer is disposed on substantially an entire area of contact between said fastener and the at least one member of the plurality of members.

13. The fastener as set forth in claim 7, wherein said shaft portion is substantially cylindrical and said sliding layer is adapted to engage the at least one member of the plurality of members to provide for substantially maintenance free rotational movement of the at least one member of the plurality of members relative to said fastener.

14. The fastener as set forth in claim 13, wherein said sliding layer is adapted to engage all of the plurality of members to provide for substantially maintenance free rotational movement of all of the plurality of members relative to said fastener.

15. The fastener as set forth in claim 7, wherein said shank portion is fabricated from a material having relatively high ductility, tensile strength and shear strength.

16. The fastener as set forth in claim 15, wherein said shank portion is fabricated from a metallic material.

17. The fastener as set forth in claim 16, wherein said shank portion is fabricated from steel.

18. The fastener as set forth in claim 7, wherein said shank portion comprises a hollow tube.

19. The fastener as set forth in claim 18, further comprising an elongated pin disposed within said shank portion to reinforce said fastener.

20. The fastener as set forth in claim 19, wherein said elongated pin comprises a pair of mutually engageable fastener portions.

21. The fastener as set forth in claim 20, wherein said pair of mutually engageable fastener portions further comprise at least one head having a generally concave surface disposed thereon to facilitate flanging said first end during engagement of said pair of mutually engageable fastener portions.

22. The fastener as set forth in claim 20, wherein said pair of mutually engageable fastener portions are threadably engageable with one another.

23. The fastener as set forth in claim 7, wherein said sliding layer comprises a lubricious plastic material.

24. The fastener as set forth in claim 23, wherein said lubricious plastic material is selected from the group consisting of fluoropolymers, acetals, acrylonitrile-butadiene-styrenes, styrene-acrylonitriles, polystyrenes, polycarbonates, polyimides, polyetherimides, polyether ether ketones, polyethylenes, polypropylenes, polysulfones, polyamides, polyphenylene sulfides, polyurethanes, polyesters, polyphenylene oxides, and blends and alloys thereof and filled compositions thereof.

25. The fastener as set forth in claim 23, wherein at least one filler selected from the group consisting of carbon, graphite, aluminum oxide, ceramic materials, glass, bronze, molybdenum sulphite, fluoropolymer, silicone, molybdenum disulfide, and combinations thereof, is added to the sliding layer.

26. The fastener as set forth in claim 23, wherein said fastener further comprises an intermediate layer disposed between said shank portion and said sliding layer, wherein said intermediate layer adheres said sliding layer to said shank portion.

27. The fastener as set forth in claim 26, wherein said intermediate layer comprises a fluoropolymer.

28. The fastener as set forth in claim 27, wherein said intermediate layer is coextensive with said sliding layer.

29. The fastener as set forth in claim 27, wherein said sliding layer is selected from the group consisting of polytetrafluoroethylene, polyimide and polyether ether ketone, and combinations thereof.

30. A fastener adapted to join a plurality of members to one another, said fastener comprising:
- a shank portion elongated along a central axis thereof, said shank portion adapted for receipt within apertures disposed in the plurality of members;
- said shank portion having a first end and a second end, said first end and said second end each adapted for being flanged in a cold-forming operation to capture the plurality of members therebetween;
- a sliding layer disposed on an outer surface of said shank portion, wherein said sliding layer is adapted to engage at least one member of the plurality of members to provide for substantially maintenance free sliding movement of the at least one member relative to said fastener.

31. A fastener adapted to join a plurality of members to one another, said fastener comprising:
- a shank portion elongated along a central axis thereof, said shank portion adapted for receipt within apertures disposed in the plurality of members;
- said shank portion having a first end and a second end, said first end and said second end each adapted for being flanged to capture the plurality of members therebetween;
- a sliding layer having a coefficient of friction no greater than 0.2, the sliding layer being disposed on an outer surface of said shank portion, wherein said sliding layer is adapted to engage at least one member of the plurality of members to provide for substantially maintenance free sliding movement of the at least one member relative to said fastener.

32. A fastener adapted to join a plurality of members to one another, said fastener comprising:
- a shank portion fabricated from a metallic material, said shank portion being elongated along a central axis thereof, said shank portion adapted for receipt within apertures disposed in the plurality of members;
- said shank portion having a first end and a second end, said first end and said second end each adapted for being flanged to capture the plurality of members therebetween;
- a sliding layer disposed on an outer surface of said shank portion, wherein said sliding layer is adapted to engage at least one member of the plurality of members to provide for substantially maintenance free sliding movement of the at least one member relative to said fastener.

* * * * *